（12） United States Patent
Lathers

(10) Patent No.: US 6,217,102 B1
(45) Date of Patent: Apr. 17, 2001

(54) APPARATUS FOR COVERING A TRUCK BOX (TONNEAU COVER) AND MOUNTING STRUCTURE THEREFOR

(76) Inventor: Michael W. Lathers, P.O. Box 447, Eastport, MI (US) 49627

( * ) Notice: Subject to any disclaimer, the term of this patent is extended or adjusted under 35 U.S.C. 154(b) by 0 days.

(21) Appl. No.: 09/427,527

(22) Filed: Oct. 26, 1999

Related U.S. Application Data

(60) Provisional application No. 60/105,610, filed on Oct. 26, 1998.

(51) Int. Cl.⁷ ........................................................ B60P 7/02
(52) U.S. Cl. ............................... 296/100.07; 296/100.1
(58) Field of Search ....................... 296/100.02, 100.04, 296/100.06, 100.07, 100.08, 100.09, 100.1, 100.16, 167

(56) References Cited

U.S. PATENT DOCUMENTS

| | | |
|---|---|---|
| D. 398,282 | 9/1998 | Dirks . |
| 3,765,717 * | 10/1973 | Garvert ........................ 296/100.1 X |
| 3,829,151 * | 8/1974 | Fellenstein .................. 296/100.06 X |
| 4,335,916 * | 6/1982 | Gutgsell ........................... 296/100.1 |
| 5,011,214 | 4/1991 | Friesen et al. . |
| 5,018,777 | 5/1991 | Swenson et al. . |
| 5,121,960 | 6/1992 | Wheatley . |
| 5,183,309 | 2/1993 | Jordan . |
| 5,203,364 * | 4/1993 | Koole ........................... 296/100.1 X |
| 5,228,739 * | 7/1993 | Love .............................. 296/167 X |
| 5,322,336 | 6/1994 | Isler . |
| 5,364,154 * | 11/1994 | Kaiser . |
| 5,584,521 * | 12/1996 | Hathaway et al. .......... 296/100.16 X |
| 5,636,893 * | 6/1997 | Wheatley et al. . |
| 5,788,315 * | 8/1998 | Tucker .............................. 296/100.16 |
| 5,951,095 * | 9/1999 | Herndon ........................ 296/100.1 X |
| 6,076,881 * | 6/2000 | Tucker .............................. 296/100.07 |

* cited by examiner

Primary Examiner—Joseph D. Pape
(74) Attorney, Agent, or Firm—Carrier, Blackman & Associates, P.C.; Joseph P. Carrier; William D. Blackman

(57) ABSTRACT

A tonneau cover for covering a truck box of a pickup type vehicle, comprises a rigid center panel, two rigid side panels, each adapted to be fixed along a top edge of one longitudinal side wall of a truck box, the center panel engaging the side panels in a closed position of the center panel; and mechanisms for supporting the center panel on the truck box such that the center panel may be vertically moved relative to the truck box, between the closed position and an open position in which the center panel is entirely disposed above the side panels. The cover side panels preferably include a seal disposed on inner longitudinal sides of the side panels for sealingly engaging the center panel in the closed position thereof, the center panel is disposed substantially parallel to the side panels in the open position, and the support mechanism includes a plurality of attachment brackets adapted to be fixed to the side walls of said truck box, and pivot mechanisms connected between the attachment brackets and lateral sides of the center panel for permitting the center panel to move between the open and closed positions thereof.

15 Claims, 15 Drawing Sheets

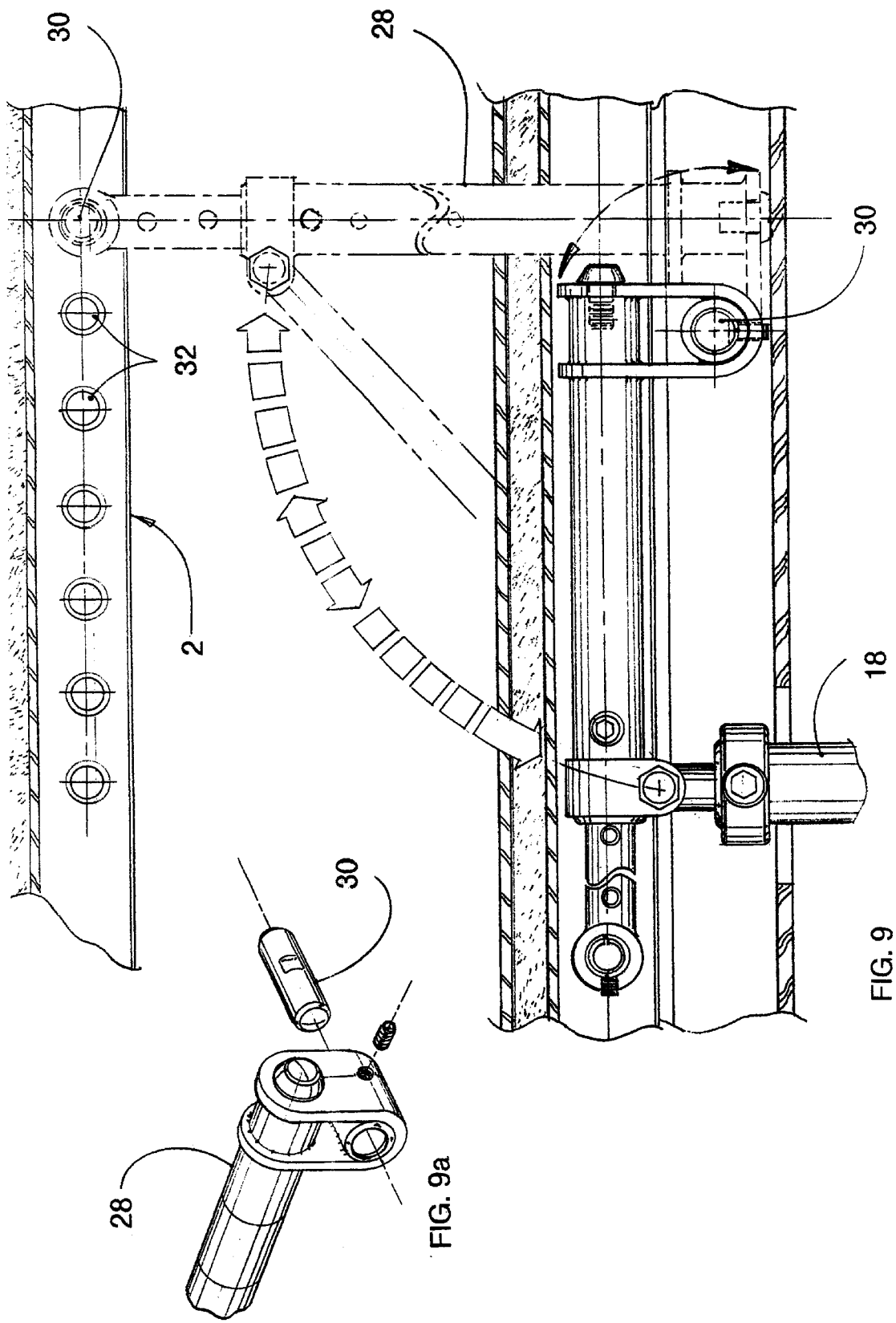

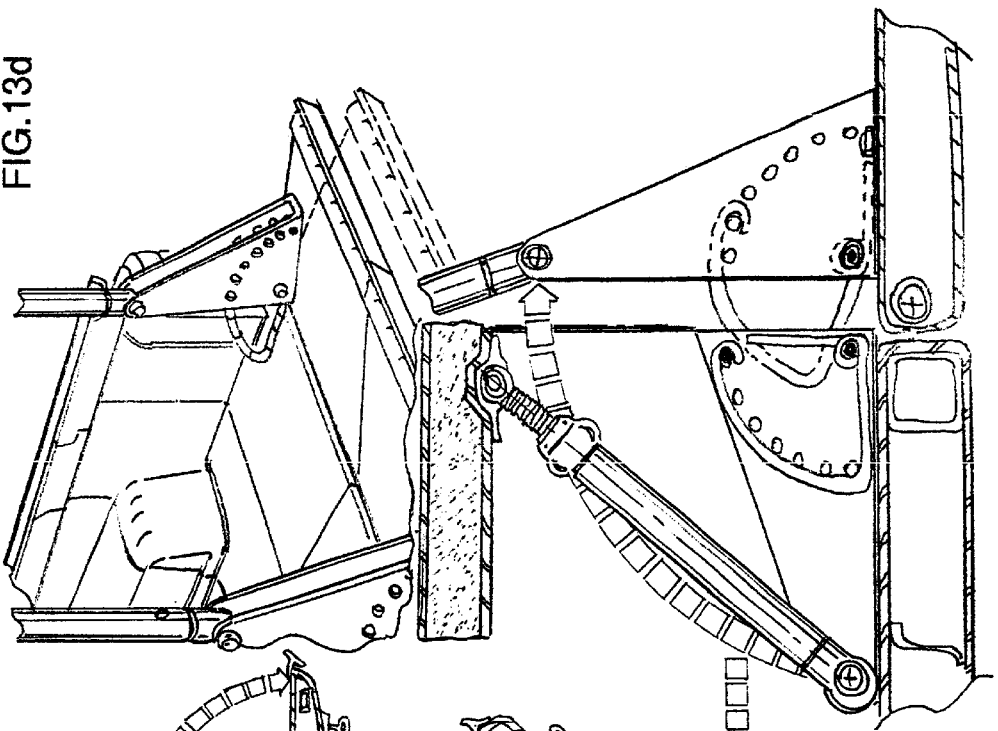
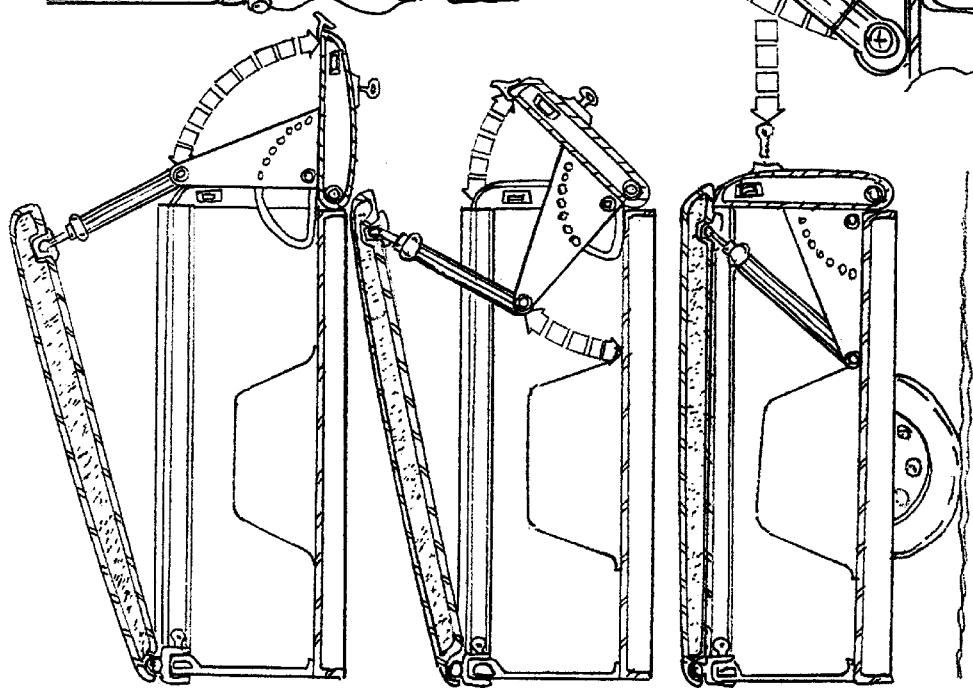

US 6,217,102 B1

APPARATUS FOR COVERING A TRUCK BOX (TONNEAU COVER) AND MOUNTING STRUCTURE THEREFOR

This application claims priority under 35 USC §119 from U.S. Provisional Patent Application Ser. No. 60/105,610, filed Oct. 26, 1998, and entitled "Tonneau Cover for Pick-Up Type Vehicle and Attachment Mechanism therefor.

BACKGROUND OF THE INVENTION

1. Field of the Invention

The present invention relates to rigid, high quality apparatus for covering the rear cargo area of a pick-up type vehicle, commonly known as a tonneau cover, and mounting structure therefor. More particularly, the present invention relates to such an apparatus that is durable, yet lightweight, highly versatile in use, relatively economical to manufacture, easy to install, easy to manipulate for accessing the rear cargo area, and easy to remove if desired. Further, the apparatus is partially generic for use with virtually all makes of pickup trucks, and allows for the use of superior molding technologies for high strength, low weight, and custom shaping.

2. Description of the Relevant Art

Tonneau covers are well known, and are generally either soft, being constructed of a flexible, lightweight material such as canvas, or rigid, being constructed of heavier materials such as fiberglass. Soft covers may be less expensive, but provide no security or load-bearing ability. Rigid tonneau covers are favored for their durability, strength, security, and load-bearing ability, but rigid tonneau covers proposed in the past have several categories of limitations and disadvantages associated therewith.

For example, attachment of existing rigid tonneau covers is complicated. They typically include a maze of hardware for attaching to the vehicle, or they require drilling into the vehicle body. Some use a piano type hinge in the front and gas shocks drilled for support into the vehicle body at the rear. Most open like an alligator mouth, but some do hinge in the middle and open from each side.

Once attached, the conventional rigid tonneau covers, including the various attachment options, limit access to the cargo area and limit the size of what can be carried. In order to take full advantage of the cargo area, one must completely remove the cover. Complete removal of the conventional rigid cover is, however, typically almost as complicated as attachment.

The substantial weight of the conventional rigid cover further complicates removal as well as shipping and storage thereof. Many of these covers weight around 150 pounds or more. Combining the awkward size of most covers and the complicated attachment mechanisms therefor, it is almost impossible for one person alone to remove the cover. Once removed, these covers are difficult to store due to their size and weight. Freight costs related to size and weight of covers restrict the distribution thereof. Large retailers do not carry them because of the high shipping costs and storage difficulties. Many are sold from lots that are outside, usually in a gravel fenced enclosure, which limits public exposure and distribution.

Most of the conventional rigid covers are manufactured from fiberglass, aluminum, or steel. Steel and aluminum covers are easily dented or damaged and are limited in terms of design freedom, so fiberglass is used most often. Fiberglass covers are typically made with an open face mold using resins and fiber cloth either laid in, blown in, or sprayed in with a gun that mixes resin and chops the glass. Since there is little internal strength to a fiberglass resin product, the covers are thick and therefore very heavy. They are also typically molded as a single piece. As a single piece, the cover must be manufactured for a particular model of pickup truck which further adds to the manufacturing cost of conventional rigid tonneau covers and creates additional inventory difficulties.

As a general matter, the conventional fiberglass tonneau covers are quite disadvantageous in terms of durability because there is very limited give between the covers and the truck beds to which they are attached. When the truck bed flexes, twists, bumps, etc. so too does the tonneau cover, and with limited give between the cover and the bed, peripheral edges, connection points, and other stressed portions of the cover become damaged. Further, in conventional designs, when pneumatic or hydraulic cylinders are used to facilitate pivotal lifting of an end of the cover, the cylinders are connected to longitudinally intermediate side portions of the cover, rather than to the non-pivoted end of the cover, for thereby permitting the non-pivoted end of the cover to be raised a relatively large extent. Such intermediate location of the cylinders undesirably places a relatively large load on the cylinders because the distance (lever arm) from the cylinders to the pivot is relatively short, and also place a relatively large load on the portions of the cover to which the cylinders are attached because of the distance from the free end of the cover. Thus it has been conventionally necessary to use cylinders of relatively large capacity, and to significantly reinforce the connecting portions of cover.

Another problem with conventional rigid covers is the quality of appearance. When painted, conventional fiberglass covers in time fade, crack, and show what is called print through where one can see the woven cloth within the fiberglass resin. The underside typically has a rough texture as a result of the fiberglass molding and does not paint well, if painted at all.

Fiberglass covers, due to their paint problems, and aluminum or steel covers, due to their limitations is design freedom, tend to look like an afterthought rather than an integral part of the pickup truck. Appearance problems combined with access limitations, significant weight, attachment and removal problems, and shipping and storage problems, have severely limited the marketability and appeal of known tonneau covers. The following U.S. Patents disclose some specific, conventional tonneau covers.

Dirks, U.S. Design Pat. No. D 398,282 discloses a tonneau cover for a pickup truck bed having two wedge-shaped vertical side members which support a large flat substantially horizontal cover plate, which appears to be pivotally mounted with respect to the side members. Forward of the front edge of the cover plate are two more square auxiliary plates which are disposed side by side and which are smaller than the cover plate.

Friesen et al., U.S. Pat. No. 5,011,214 discloses a tonneau cover made in three panel segments which are pivotally and hingedly joined together, and which are arranged in a side-by-side orientation over the truck bed. The panel segments are connected together by levers and links, somewhat like the components of a convertible top. The hinges between the panel segments run parallel to the longitudinal axis of the vehicle. An actuator may be provided for moving the panel segments between an extended condition with the panel segments arranged side by side and substantially coplanar, and a folded condition with the panel segments arranged face to face at a side edge of the truck bed. Although this design provides the advantages of durability and strength gained from a rigid cover, it is somewhat complex, limits full access to the truck bed, and is difficult to remove.

Swenson et al., U.S. Pat. No. 5,018,777 discloses a hinge and connection assembly kit for a removable truck cap as opposed to a cover. Each hinge connection assembly grasps the channel rail of a box sidewall, by clamping the truck rail with a tightenable threaded damping plate, and includes a hinge mounting bolt. The head of the hinge mounting bolt rests against the truck box side wall. This design provides the feature of easy removeability, but is designed for use with truck cap or camper shell rather than a tonneau cover. Such a design yields a cap that is typically heavy and awkward to open or remove. It also limits access to the truck bed without full removal.

Wheatley, U.S. Pat. No. 5,121,960 discloses a rail attachment system for a flexible truck tonneau cover. The rail attachment system of Wheatley includes a pair of matching clamping members which clamps a rail to a truck bed side wall without drilling holes therein. A nut and bolt clamp the two clamping members together against the truck wall section. Although easy to remove, this design is limited to a flexible tonneau cover and does not provide the advantages of a rigid tonneau cover such as durability, strength, and load bearing characteristics.

Jordan, U.S. Pat. No. 5,183,309 discloses a rigid, low profile tonneau cover for a truck. The tonneau cover of Jordan is made in three sections which are hingedly and pivotally joined together. As in the Friesen reference, the hinges between the panel segments run parallel to the longitudinal axis of the vehicle. A framework is provided below and supporting the center section, and the side panels are attached to the center section using gas shocks, so they can be pivotally lifted upwardly for access to the contents of the truck bed. Although providing easy access, this design limits access to the truck bed, and is difficult to mount as well as to remove.

Isler, U.S. Pat. No. 5,322,336 discloses a hinged tonneau cover for a pickup truck. The tonneau cover of Isler is a framework covered by a soft top, which is attached to the front of the truck bed with a hinge connection, and which is attached at the back by a pair of gas shocks. Specially modified C clamps are provided to connect the base of each gas shock to the truck bed, and the C clamps mount onto the truck side wall without requiring drilling holes thereinto. Although easy to attach and remove, this design is limited to a flexible tonneau cover and does not provide the advantages of a rigid tonneau cover such as durability, strength, and load bearing characteristics.

SUMMARY OF THE INVENTION

The present invention has been developed to overcome the foregoing limitations and disadvantages of conventional tonneau covers, and to generally fulfill a great need in the art for a rigid, lightweight and versatile tonneau cover, which is easy to manipulate when installed on a vehicle, which is easy to install and remove, which provides full access to the pickup truck cargo area, which has a high quality appearance, and which is inexpensive to ship, store, and manufacture.

According to the invention there is provided a tonneau cover for covering a truck box of a pickup type vehicle, comprising a rigid center panel for covering the cargo area of a pickup truck box and providing access thereto, two rigid side panels, each adapted to be fixed on a top edge of one longitudinal side wall of the truck box, and to engage the center panel in a closed position thereof, means for supporting the center panel on the truck box such that the center panel may be vertically moved relative to the truck box between the closed position and an open position in which the entire center panel is entirely above the side panels with a space therebetween.

Preferably, a sealing means is disposed on the inner longitudinal sides of the side panels engaging the center panel in the closed position thereof to prevent moisture from entering the cargo area of the truck box.

It is also preferable that: the center panel be disposed substantially parallel to the side panels in the open position thereof to provide access to the entire cargo area of the truck box; support means include a plurality of attachment brackets adapted to be fixed to the side walls of the truck box, and pivot means connected between the attachment brackets and lateral sides of the center panel for permitting the center panel to move between the open and closed positions thereof, and, the pivot means includes two pivot mechanisms connected to each lateral side of the center panel, that each pivot mechanism includes a fluid cylinder, and that the fluid cylinder is adjustably extensible for raising the center panel to different heights for providing varying degrees of access to the cargo area of the truck box.

It is still further preferable that the side panels, and the center panel, are molded of plastic; and that the center panel has a universal size for use on all types of pickup trucks or at least similar sized pickup trucks, while the side panels would come in varying sizes for use on different types of trucks, thus significantly reducing manufacturing costs, storage costs, etc. Also, the center panel is preferably formed with a lightweight multi-layer construction, including a molded inner section, a foamed middle core bonded to the inner section with adhesive or the like, and a molded outer section bonded to inner section at peripheral edges thereof, but floatingly disposed above the foamed middle core. Most preferably, in such multi-layer construction the outer section (which is normally the only section of the panel exposed to view) will have special, ornamental projections, indentations and/or coloring molded therein, to enhance the appearance thereof, give manufacturer and/or vehicle line brand recognition, etc. Further, optional accessories may be provided for attachment to the central panel, including a ladder rack, a ski rack, a luggage rack, etc. These accessories are preferably molded plastic components attached to the inner and outer sections of the central panel at the peripheral surfaces thereof.

According to another aspect of the invention, there is provided a tonneau cover as recited above, further comprising: a rigid front panel adapted to be disposed forwardly of the center panel on the truck box, and engaging the side panels and the center panel in a closed position of the front panel; and means for supporting the front panel on the truck box such that the front panel may be vertically moved relative to the truck box, between the closed position thereof and an open position in which the front panel is entirely disposed above the side panels in order to provide access to a front portion of the cargo storage area of the truck box. Alternatively, this aspect of the invention may comprise a means for pivotally attaching the front panel to the truck box such that the front panel may rotate about the truck box, between the closed position thereof and an open position thereof in which one lateral side of the front panel is disposed above one of the side panels.

According to yet another aspect of the invention, there is provided a tonneau cover for covering a truck box of a pickup type vehicle, comprising a rigid center panel, two rigid side panels adapted to be respectively fixed along top edges of longitudinal side walls of the truck box wherein the center panel engages the side panels in a closed position of the center panel; and means for pivotally attaching a front side of the center panel to the truck box such that the center panel may rotate relative to a front wall of the truck box, between the closed position thereof and a plurality of open positions in which a rear side of the center panel is disposed above the side panels; and means for raising the rear side of the center panel between the closed position thereof and a plurality of open positions thereof, and for selectively supporting the rear side in various ones of the open positions to provide variable access to the cargo area of the truck box.

It is preferable for this aspect of the invention that the raising and supporting means include a plurality of attachment brackets adapted to be fixed to the side walls of the truck box, and a plurality of extension means demountably connected between corresponding ones of the attachment brackets and rear lateral sides of the center panel, thus allowing the cover to be opened beyond the normal range of motion of the raising and supporting means, including opening the cover to a fully opened position perpendicular to the floor of the truck bed.. It is further preferable that each of the extension means include a fluid cylinder for raising the rear side of the center panel, and that the fluid cylinder is adjustably extensible, and disposable in engagement with different portions of associated support brackets for raising the rear side of the center panel to different heights.

According to yet another aspect of the invention, there is provided an attachment bracket for supporting a tonneau cover on a truck box of a pickup type vehicle, the bracket comprising a gripping means for clamping on an upper lip of a sidewall of the truck box, a support section adapted to support the tonneau cover thereon; and a stabilizing section adapted to engage an inner surface of the truck box side wall below the upper lip. It is preferable that the support section includes a plurality of substantially parallel upstanding walls, each wall having a recess defined in an upper edge thereof for detachably and pivotally receiving a support member of the tonneau cover therein. It is also preferable that the gripping means comprises a pair of opposing gripping wall elements adapted to clamp the upper lip of the truck sidewall therebetween; and means for adjusting a distance between the gripping wall elements. It is further preferable that the stabilizing section include means for damping transmission of vibrations between the stabilizing section and the truck sidewall and to protect the surface of the truck sidewall, and that the stabilizing section is adjustable so as to extend different distances away from the gripping means, for example, the stabilizing section comprises a plurality of removable segments to adjust the projecting distance of the stabilizing section.

According to yet another aspect of the invention, a tonneau cover or a central panel cover of same may be provided with a rear tailgate. The tail gate would replace the conventional tailgate at the rear of the pickup bed, be preferably be constructed with a multiple layer construction similar to the central panel of the tonneau cover, and would pivot upwardly about the rear edge of the central panel.

It is an object of the present invention to provide a rigid tonneau cover which is lightweight and sturdy, yet has a high quality appearance and paintability.

Another object of the present invention is to provide a rigid tonneau cover which is easy to mount on the truck box, without the need for permanent alterations to the truck body, and is also easy to remove to provide full access to the truck box cargo area.

It is a further object of the invention to provide a highly versatile, rigid tonneau cover which may open in a variety of methods and a wide range of positions to provide different degrees of access to the truck box cargo area.

Another object of the invention is to provide a rigid tonneau cover comprising several independently moveable panels to facilitate storage and shipping, and to add design versatility.

Yet another object of the invention is to provide a rigid tonneau cover including many generic components to fit most truck models, thereby providing cost savings related to manufacture of generic components.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 9 is a larger view of the support mechanism shown in FIGS. 8a–8c.

FIG. 9a is a still larger view of a removable part of support mechanism shown in FIGS. 8a–8c.

FIGS. 13 and 13a–13e are views of the tonneau cover in accordance with the third preferred embodiment of the present invention as provided on a pickup truck, and disposed in a raised or open position thereof.

DETAILED DESCRIPTION OF THE PREFERRED EMBODIMENTS

Figure 1:
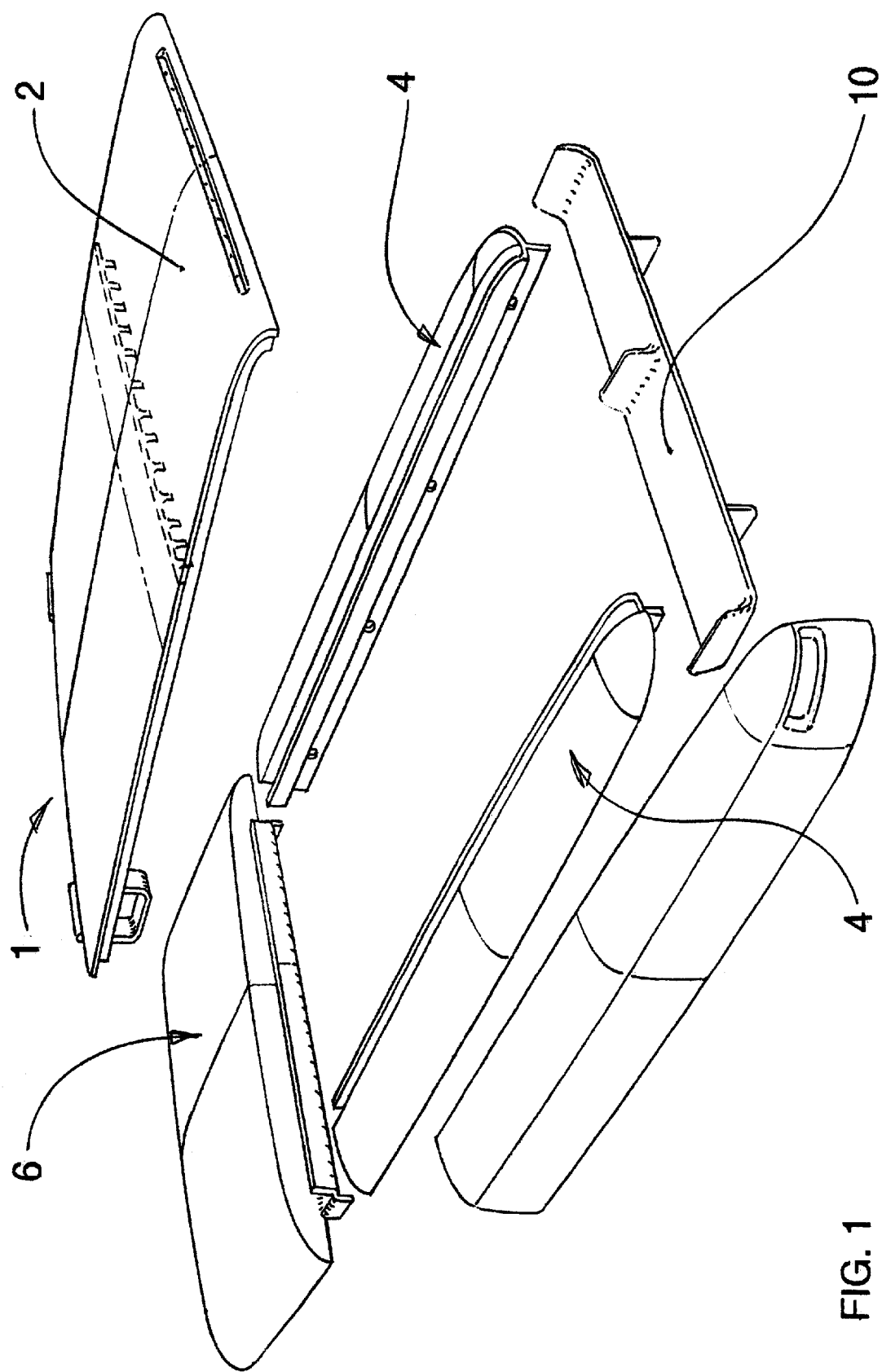
FIG. 1 is an exploded perspective view of a four panel rigid tonneau cover in accordance with the first preferred embodiment of the present invention, the view also showing an optional air dam which may be combined with the cover.

Referring to FIGS. 1–5, there is shown a rigid tonneau cover 1 for a pickup truck bed according to the first preferred embodiment of this invention. The tonneau cover 1 generally includes a rigid center panel 2, two rigid side panels 4, each adapted to be fixed on a top edge of one longitudinal side wall 12 of a truck box 3, and a rigid front panel 6 adapted to have lateral edges thereof also secured to the side walls of the truck box forwardly of the side panels. Such four panel construction of the tonneau cover is an important aspect of the invention because it permits each of the panels to have a relatively small size facilitating storage, handling, transportation, etc., it permits at least the center panel to be a generic or universal construction for use on different vehicles, it permits the cover to have significantly improved flexibility and give relative to the truck box for greater durability, etc. Also shown in FIG. 1 is an optional air dam 10, which would be connected to the rear of the center panel 2 using adhesive, fasteners or the like. The center panel 2 is, again, preferably molded to a generic size to allow mounting on most truck models, while the side panels 4 (which are mirror images of each other) and the front panel 6 are preferably adapted for particular models, but could also be generic to mount on many truck models.

The front panel 6, the side panels 4, the air dam 10 and other similar accessories discussed below are preferably manufactured of a plastic resin through an injection molding process such as reaction injection molding (RIM) and/or vacuum formed sheet molded compound (SMC) to create sturdy, lightweight panels that can be painted to the quality of steel panels and which can be molded to various design shapes. Appropriate plastic resins include ABS, polypropylene, PETE, HDPE, etc..

Figure 2:
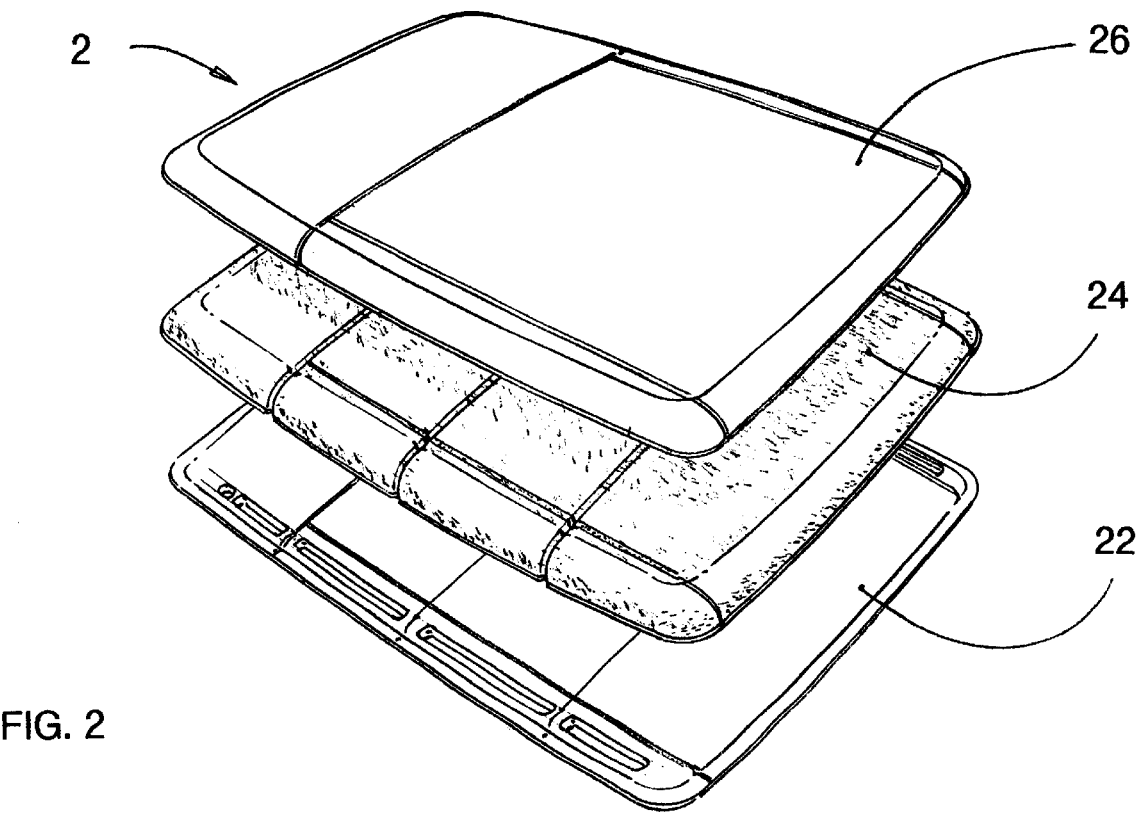
FIG. 2 is an exploded perspective view showing a construction of a center panel of the tonneau cover of FIG. 1.
Figure 2A:
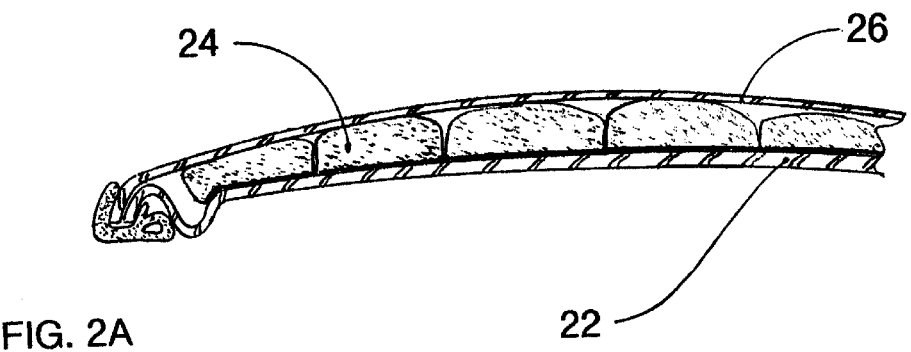
FIG. 2a is a front sectional view of the center panel in FIG. 2.
Figure 3:
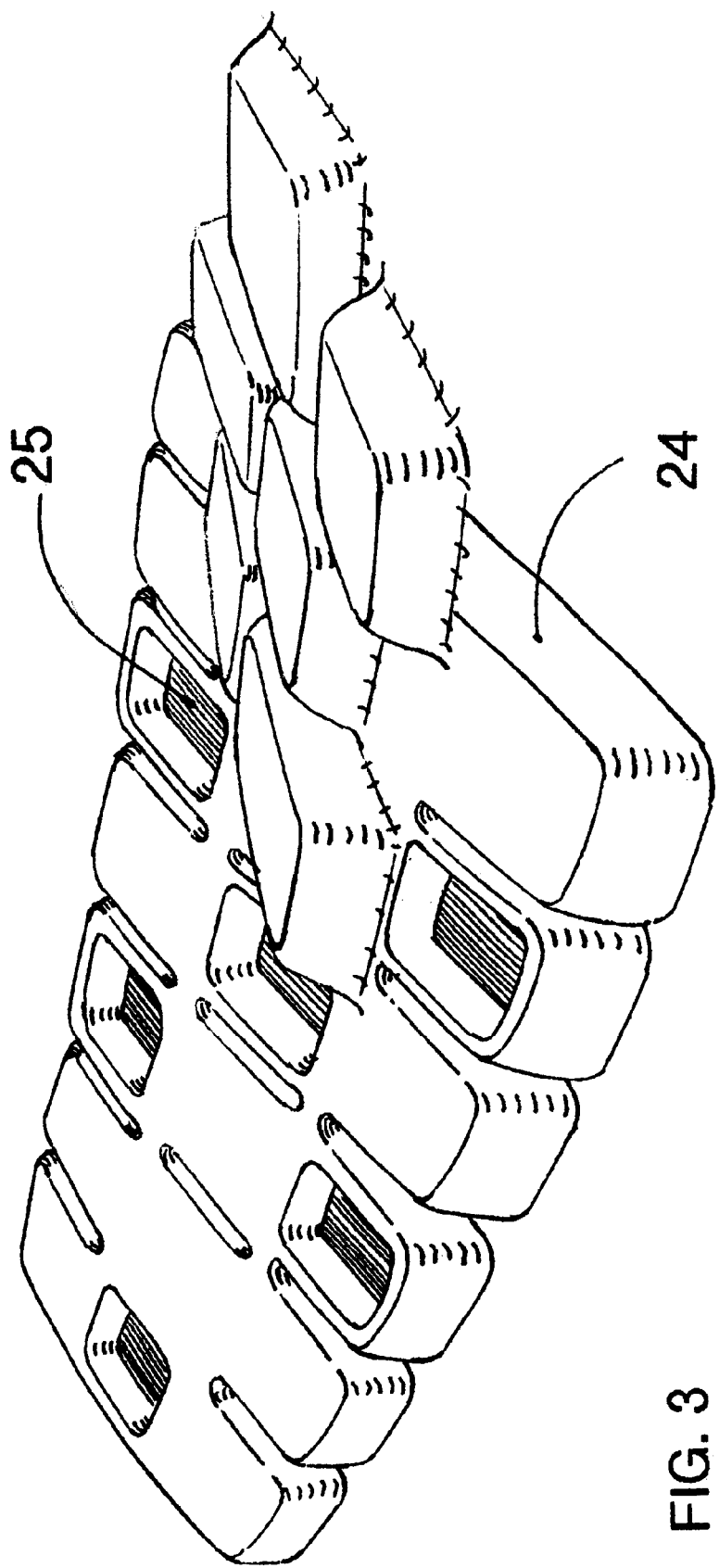
FIG. 3 is a perspective view of the foamed core of the center panel with various recesses or pockets defined therein.

The center panel 2 is constructed with a multi-layer construction as shown in FIGS. 2–3. The construction includes a molded inner section 22, a foamed middle core 24 bonded to the inner section with adhesive or the like, and a molded outer section 26 bonded to the inner section at peripheral edges thereof, but floatingly disposed above the foamed middle core. Such floating disposition of the outer section 26 is desirable because it limits damage caused to the core as the outer section shifts relative to the core during use. The inner and outer sections 22, 26 are also preferably constructed of a plastic resin similar to the side and front panels, while the foamed core 24 is constructed of polystyrene, polyurethane or the like. Most preferably, the foamed core will be formed with multiple longitudinally extending portions, in a barrel-like configuration so that when it is bonded to the inner section 22, it has a natural tendency to pull up on the inner section, thus giving enhanced strength to the center panel. Also, recesses, pockets or the like, indicated at 25 may be readily formed in the foamed core 24 as shown in FIG. 3 to accommodate portions of latch mechanisms and other mechanisms used with the tonneau cover.

In the multi-layer construction the outer section 26 (which is normally the only section of the panel exposed to view) will preferably have special, ornamental projections, indentations and/or coloring molded therein, to enhance the appearance thereof, give manufacturer and/or vehicle line brand recognition, etc. Even the air dam 10 or other optional accessories, such as a ladder rack, a ski rack, a luggage rack, etc. may be molded as parts of the outer panel, but are preferably provided as separate components for attachment to the central panel 2. These accessories are preferably attached to the inner and/or outer sections 22, 26 of the central panel at the peripheral surfaces thereof. This construction adds strength and rigidity to the central panel 2. Molded panels according to the invention preferably have a smooth, painted surface on the underside which gives the panels a very sharp appearance, unlike conventional fiberglass tonneau covers, even precisely matching the exterior painted appearance of the remainder of the vehicle.

Figure 4A:
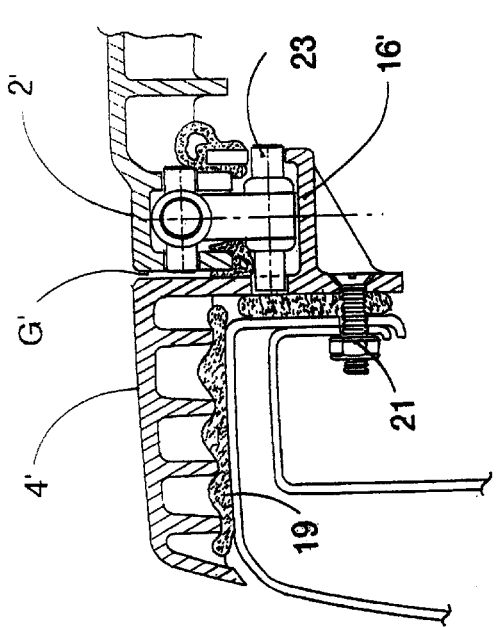
FIGS. 4a and 4b are side sectional views similar to FIG. 4, but showing a modified structure.
Figure 4B:
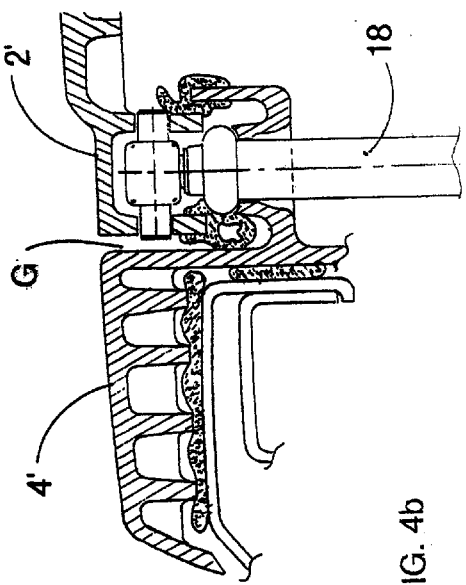
Figure 4:
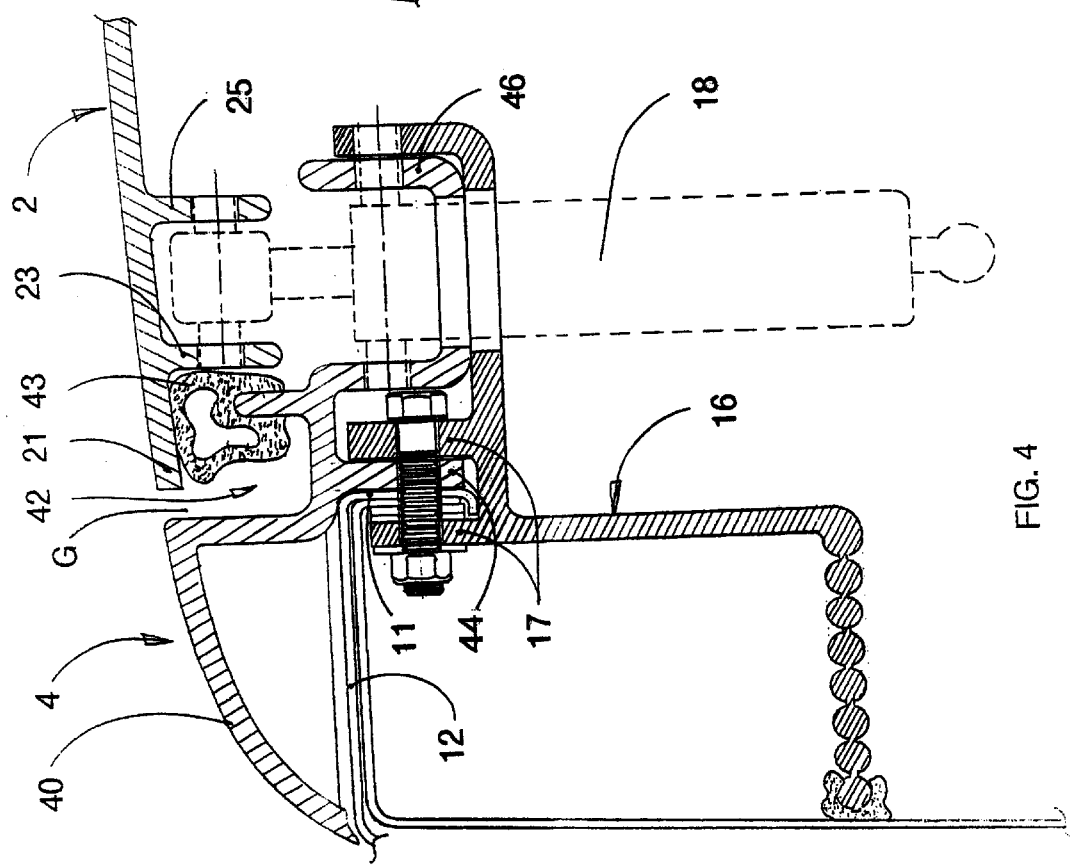
FIG. 4 is a side sectional view showing engagement between one of the side panels and a side portion of the center panel in FIG. 1, with the tonneau cover in the closed position.

Referring to FIG. 4, there is shown the structure of the side panel 4 and a side edge of the center panel, as well as a preferred arrangement for attachment of the side panels 4 to the truck box side walls 12 using an attachment or support bracket 16. Moving from outside to inside, the side panel includes an outer section 40 which covers the upper surface of the truck side wall 12, a water drainage section 42 with a flexible weather seal 43, a clamping section 44 for being secured to an inner lip 11 of the sidewall, and a functional rail section 46 through which a support cylinder may extend. The side edge of the center panel includes a peripheral edge spaced from the side panel with a gap therebetween that leads into the drainage section 42 of the side panel, and support members for being pivotally connected to the upper end of a rod of the cylinder 18.

Also shown is a support bracket 16 used to secure the side panel 4 to the truck sidewall 12, and which otherwise provides support for the tonneau cover on the vehicle, as discussed further below. The support bracket is preferably constructed of metal such as aluminum, steel, etc. The clamping section 44 of the side panel is preferably clamped to the inner lip 11 of the sidewall 12 between two parallel members 17 of the bracket using set screws. Such construction does not require any permanent modifications to the truck sidewalls, such as holes drilled therethrough.

Some vehicles have come equipped with a protective plastic panel fitted to the side walls of the truck box, typically in a snap fit manner. Such panel would have to be removed for attachment of the side panel 4 to the sidewall 12.

The provision of the gap between the peripheral edge of the center panel and the side panel very desirably permits the cover in general to have some flexibility or give relative to the truck box for enhanced durability. The drainage section channels rainwater to drain from the rear end of the cover at the rear end of the side panel, and to drain in a sideward direction from the front end of the side panel, where it meets the front panel 6.

Referring to FIGS. 4a–4b, modifications of the side panel, the peripheral edge of the center panel, and the support bracket are shown. The side panels 4' are not clamped to the inner lip, 11 but are fixed using double-sided foam tape 19 or the like typically used to mount truck caps. Bolts 21, clamps or the like typically used to mount truck caps may be used either alone or in conjunction with a snap-fit, or double-sided foam tape 19 or the like (see FIG. 1*a*), but are not preferable since they require permanent modifications to the truck body. The peripheral edge of the center panel 2' is, again, spaced from the side panel with a gap G therebetween to function as a rain channel, although the channel is not as wide as that in FIG. 4. Indicated at 23 in FIG. 1*a* is a pivot shaft of a hinge through which the center panel 2' pivots relative to the side panel 4'.

Figure 5:
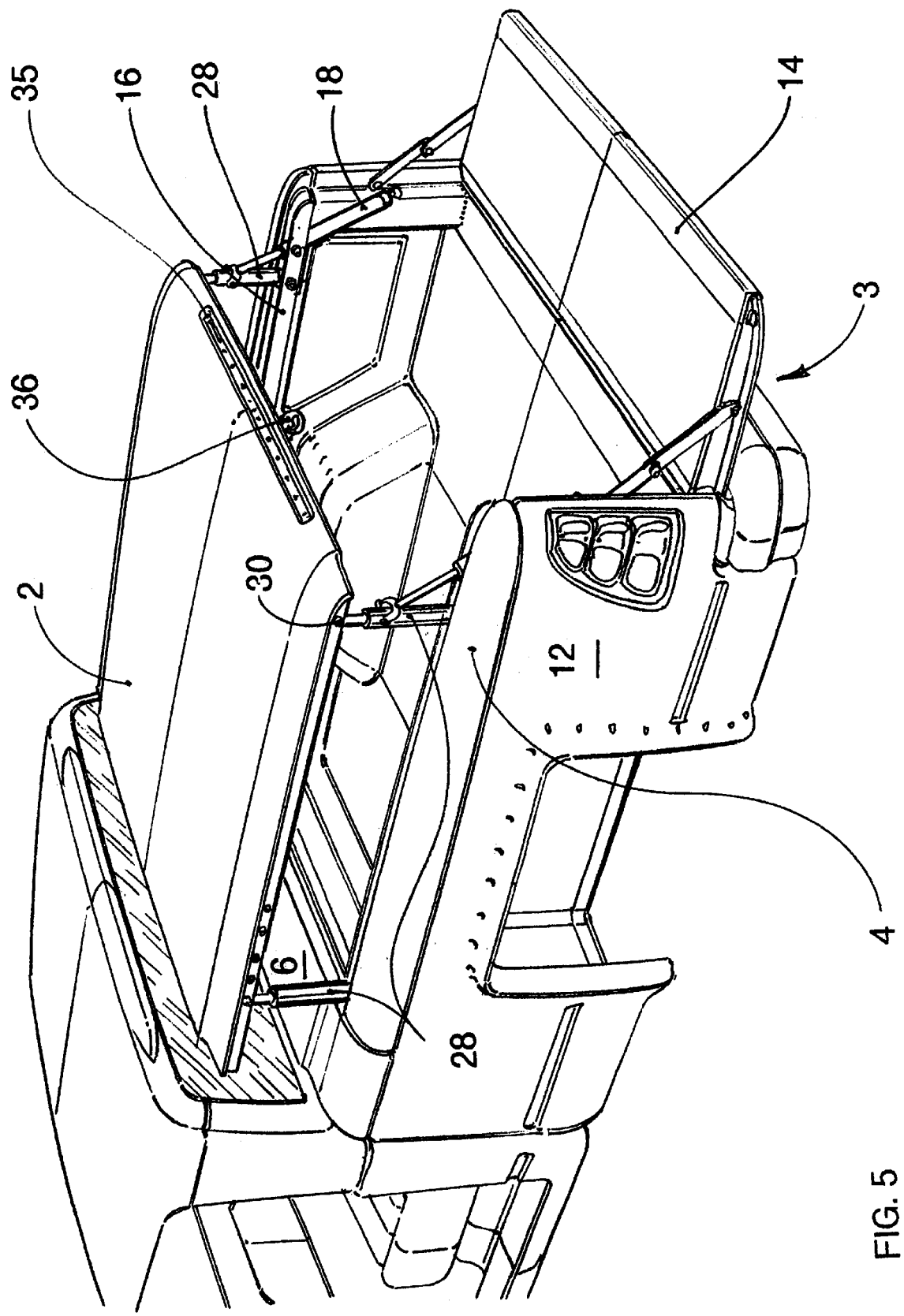
FIG. 5 is a perspective view of the tonneau cover of FIG. 1 disposed on the truck bed of a pickup type vehicle, with a first preferred mechanism for lifting and lowering the center panel of the cover relative to the other three panels.

Referring to FIG. 5, the tonneau cover according to the first preferred embodiment is shown with the center panel 2 raised fully above the truck box 3, parallel to the floor of the truck box through the first preferred support mechanism. The first preferred support mechanism supports each side of the center panel 2 at two points spaced longitudinally from each other on the truck box 3 such that the center panel 2 may be vertically moved relative to the truck box, between a closed position flush with the side panels 4 and various open positions in which the center panel is disposed above the side panels.

As shown in FIGS. 5, 8*a*–8*c* and 9, the support means for the center panel 2 comprises pivot means 28 and the attachment brackets 16. The pivot means 28 each are attached at one end to center panel 2 by means of a pin connection 30 (FIGS. 8, 9)or other like means to allow pivot means to rotate relative to center panel 2. Opposing ends of each pivot means 28 are attached to the attachment bracket 16 by means of a pin connection 30 or the like to allow each pivot means to rotate relative to corresponding attachment bracket 16.

Figure 8A:
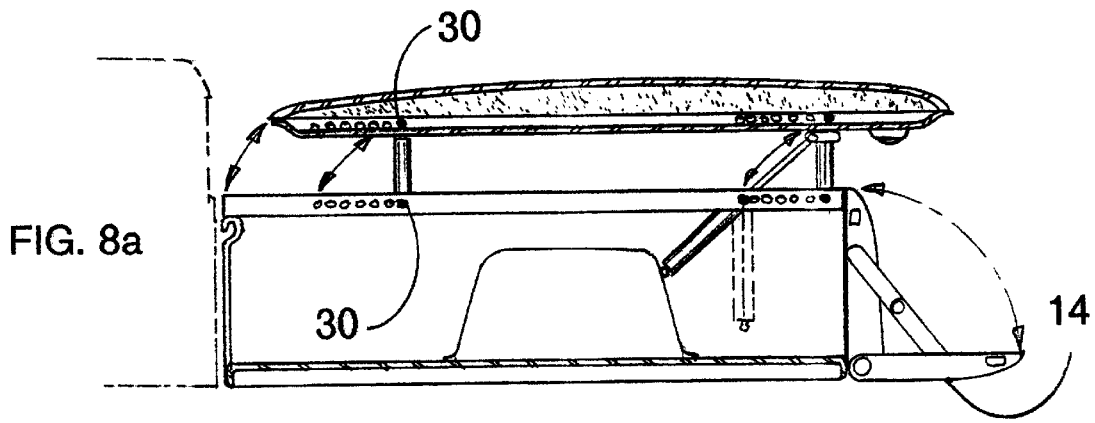
FIGS. 8a–8c are side plan views of a pickup box having the tonneau cover in accordance with the first preferred embodiment of the present invention mounted thereon the cover being shown in various open positions thereof, which are permitted by manipulation of a support mechanism thereof.
Figure 8B:
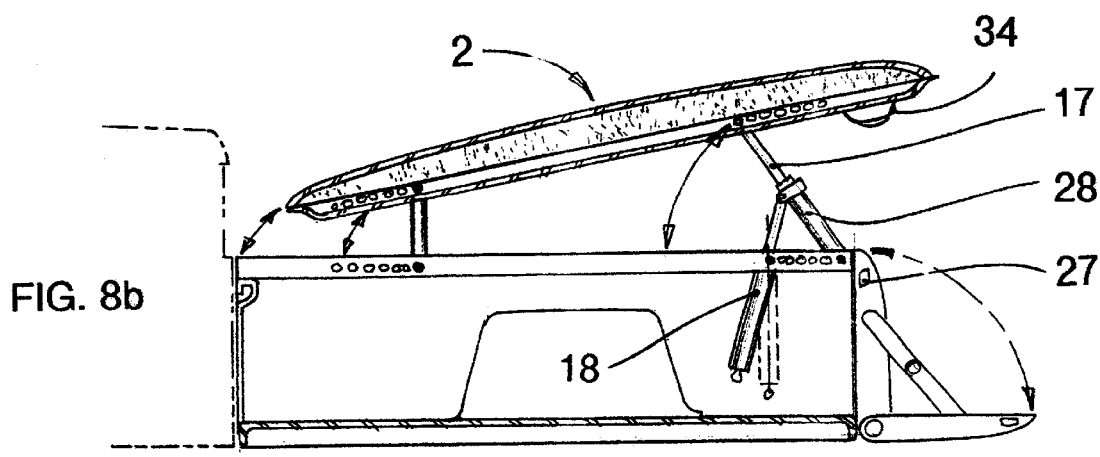
Figure 8C:
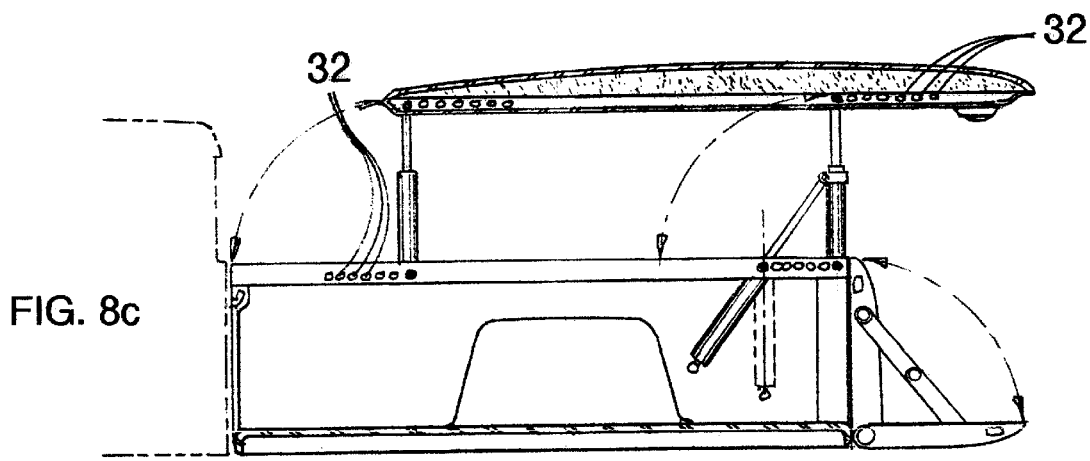
Figure 10:
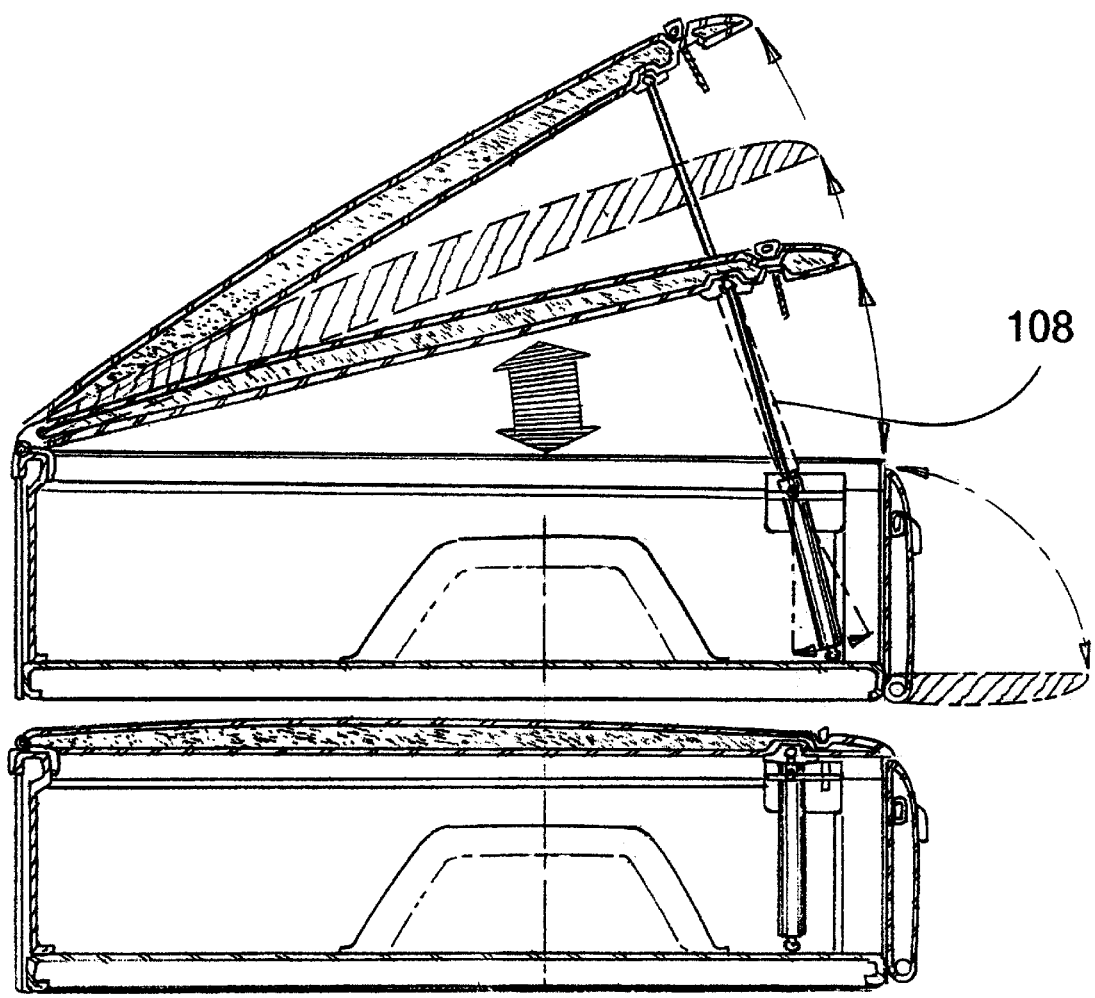
FIG. 10 is a side plan view of a pickup box having the tonneau cover mounted thereon in accordance with the second preferred embodiment of a mounting mechanism, the cover being shown in various stages of opening.
Figure 11:
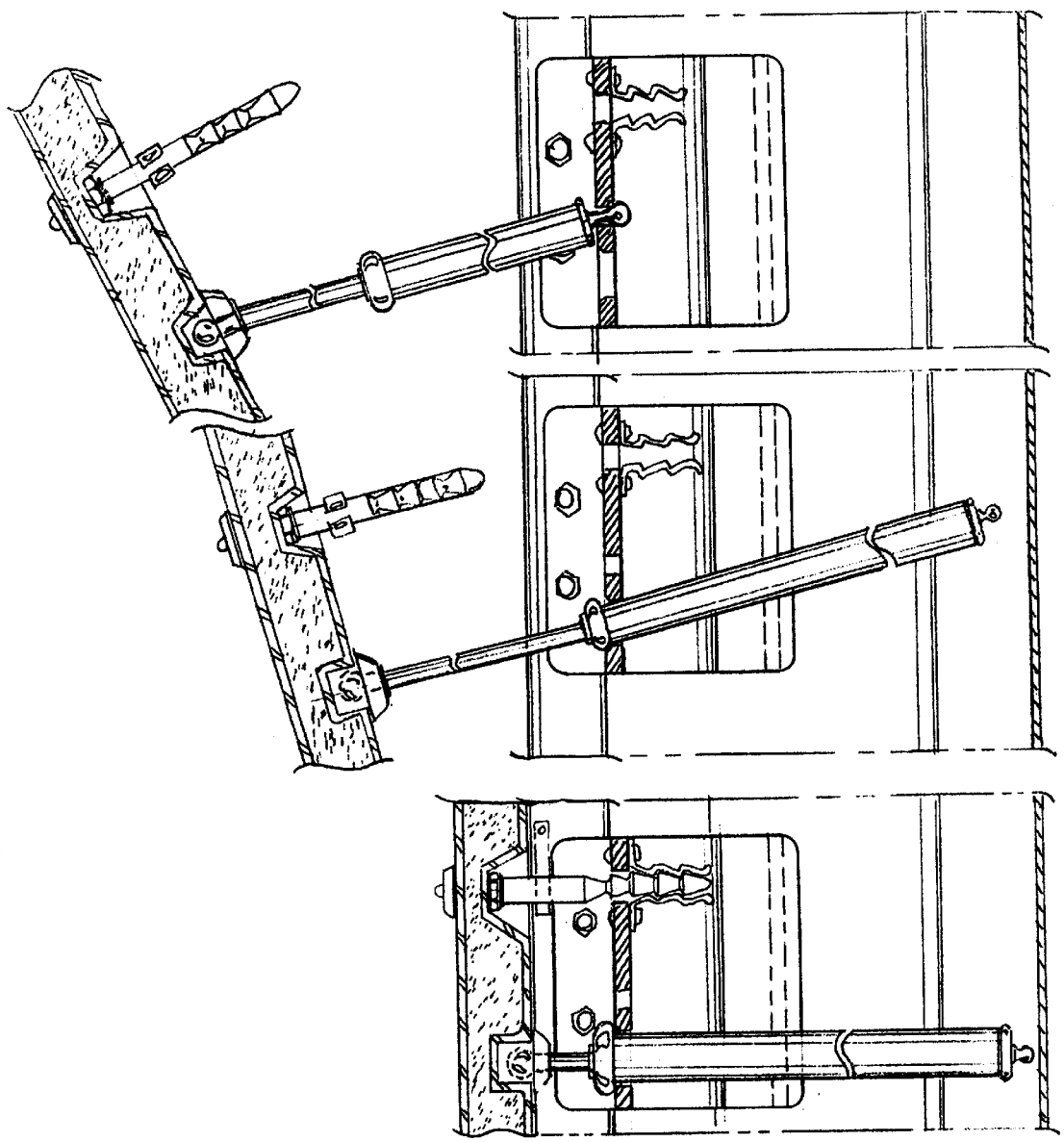
FIGS. 11a–11c are enlarged views of a portion of the mounting mechanism in FIG. 10, again, showing the various stages of opening the cover.

Fluid cylinders 18 are preferable for use as parts of the pivot means 28 to facilitate lifting of the center panel 2 as it is pivotally rotated into various open positions as shown in FIGS. 8*a*–8*c*. As best shown in FIGS. 8*a*–8*c*, 9 and 9*a*, the pivot means are adjustable to different lengths by having ends thereof connected to the center panel 2 and the side panel at different positions therealong, as permitted by placing the pivot pins into different openings 32, and by connecting the rod of the cylinder 18 to different openings formed along one of the pivot means 28. Thus in FIG. 8*a* the center panel is parallel above the truck box 3 to one extent (for increased cargo space), in FIG. 8*b* the rear end of panel 2 is higher than the front end, and in FIG. 8*c* the panel is lifted to a higher extent and shifted rearwardly over the tailgate 14 (such that it functions as a cover for the tailgate which can then be used as a workbench). Also, by removing the pivot pin 30 the center panel may be completely removed from the vehicle, while the side and front panels remain attached. This is very desirable if the truck box is to be used for supporting a fifth (towing) wheel. At 34 is a light which may be turned on and off, at 35 is an elevated rear brake light provided on the center panel 2, and at 36 is a control handle for releasing a latch mechanism securing the center panel to the side panels 4 in the closed position thereof. Optionally, side skirts and the like (not shown) may be provided for attachment to the center panel when it is disposed in a raised position thereof.

Although shown rotating rearward relative to the pickup truck, the center panel 2 could be raised straight vertically substantially parallel to the side panels 4 or pivoted fully perpendicular to the floor of the truck box 3 to provide full access to the cargo area. Although the preferred embodiment comprises four support means with one near each corner of the center panel, a plurality of support means could be used to raise the center panel in many combinations for a plurality of open positions. Multistage fluid cylinders could also be used to provide further options to raise the center panel 2 and to provide variable access to the cargo area.

Figure 5A:
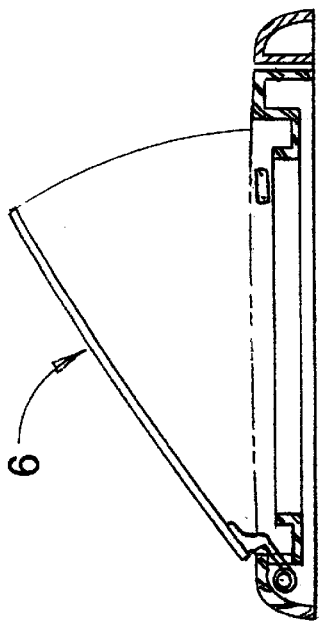
FIG. 5a is a side elevational view of a front panel of the tonneau cover, wherein the front panel is pivotable forwardly.
Figure 5B:
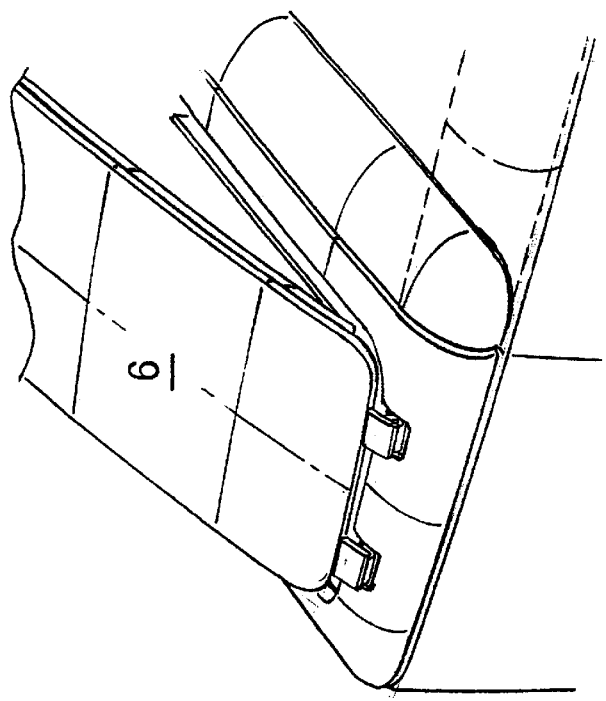
FIG. 5b is a perspective view of the front panel, wherein the front panel is pivotable laterally.

The front panel 6 of the cover is preferably pivotally connected to the side walls 12 of the truck box such that the panel 6 can pivot forwardly, (see FIG. 5*a*) or sidewardly (see FIG. 5) relative to the truck box. Also, optionally, a storage box, rack or other receptacle could be provided below the front panel 6 and be connected thereto. Further, the front panel 6 could have a multilayer construction similar to the center panel.

The first preferred embodiment provides the fluid cylinders 18 to facilitate operation of the pivot means 28 to rotate the center panel 2 into its raised positions. The fluid cylinders 18 are preferably activated by a spring loaded actuator switch 27 or the like mounted on one of the side walls 12 at the point where the tailgate 14 closes. As shown the spring-loaded switch is preferably located near the latch for the tailgate latch and operates similar to open door sensors typically used in most vehicles, wherein an edge of tailgate 14 in a closed position depressedly engages actuator switch 26. The actuator switch 26 in the closed condition may preferably be used to activate work light 34 mounted on the underside of center panel 2.

Opening of the tailgate preferably causes the spring loaded actuator switch 26 to close and thereby causes fluid cylinder rotational members 18 to actuate and rotate the center panel 2 to an open position as shown in FIG. 8*a*. It is preferable that fluid cylinders or other pivot means 28 are manually also actuable to further extend the center panel vertically in a multitude of open positions as shown in FIGS. 8*b* and 8*c*. Alternatively, they could be automatically activated by means of a control switch (not shown) or the like located in the cab of the truck, and/or on a side wall 12 of the truck box, or other preferred location, while the rotational members 18 and pivot means 28 could alternatively be activated by means of a remote control arrangement, not shown.

Rotational members 18 may also function to retain the center panel 2 in a closed position to provide security and limit access unless properly actuated by means of the actuator switch 26, or control switch (not shown) or the like secured in the cab of the truck or otherwise secured. Center panel 2 could also be maintained in the closed position by means of a locking mechanism (not shown) located in the center panel two, the side walls of the truck box 12, the tailgate 14, and other appropriate location.

Figure 6:
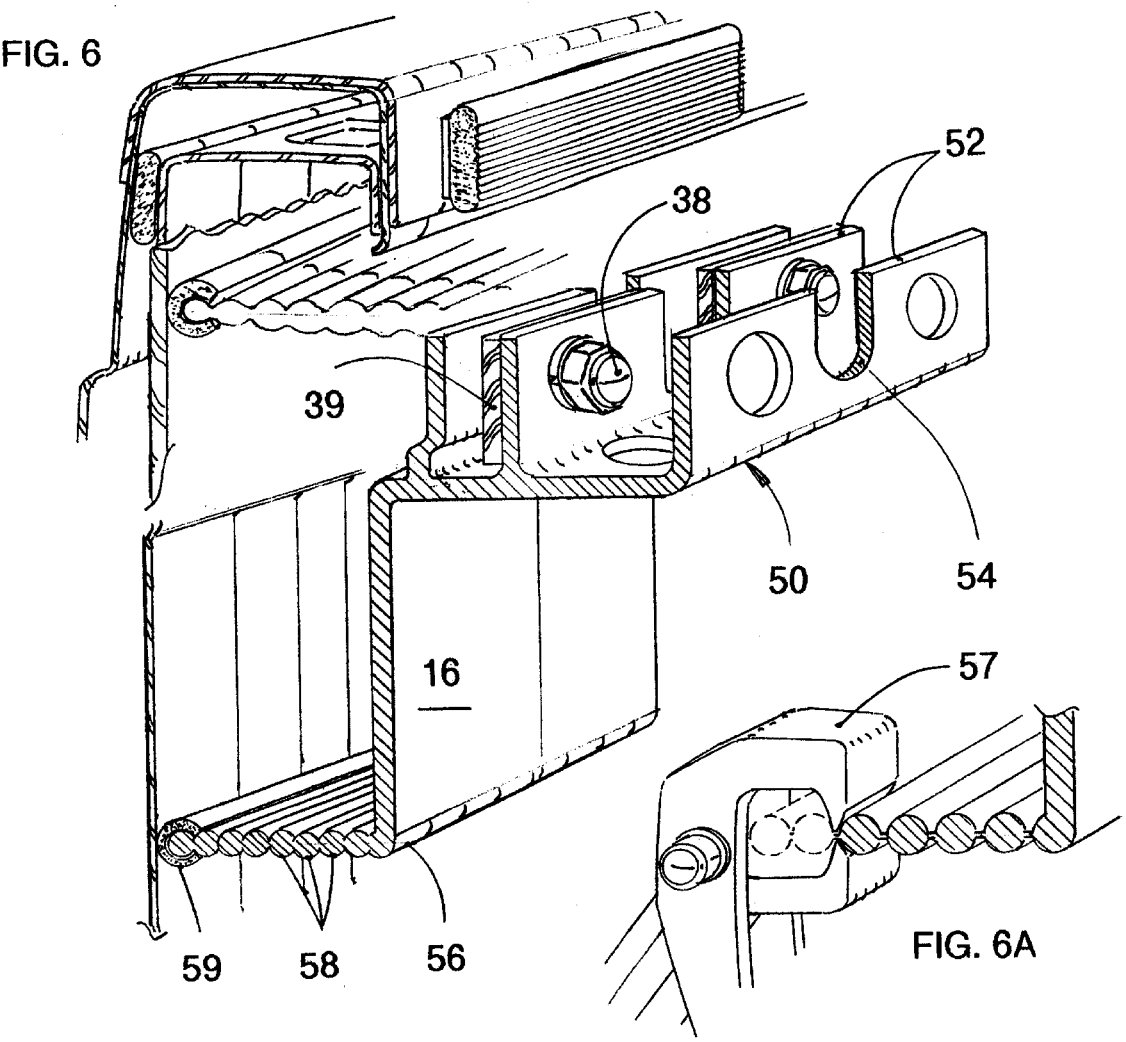
FIG. 6 is a perspective view of the attachment bracket in accordance with the first preferred embodiment of the present invention.
Figure 6A:
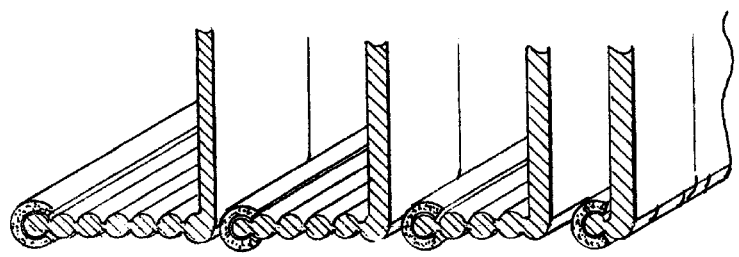
FIG. 6a is a perspective view showing the manner in which the bracket is adjusted in size.
Figure 7:
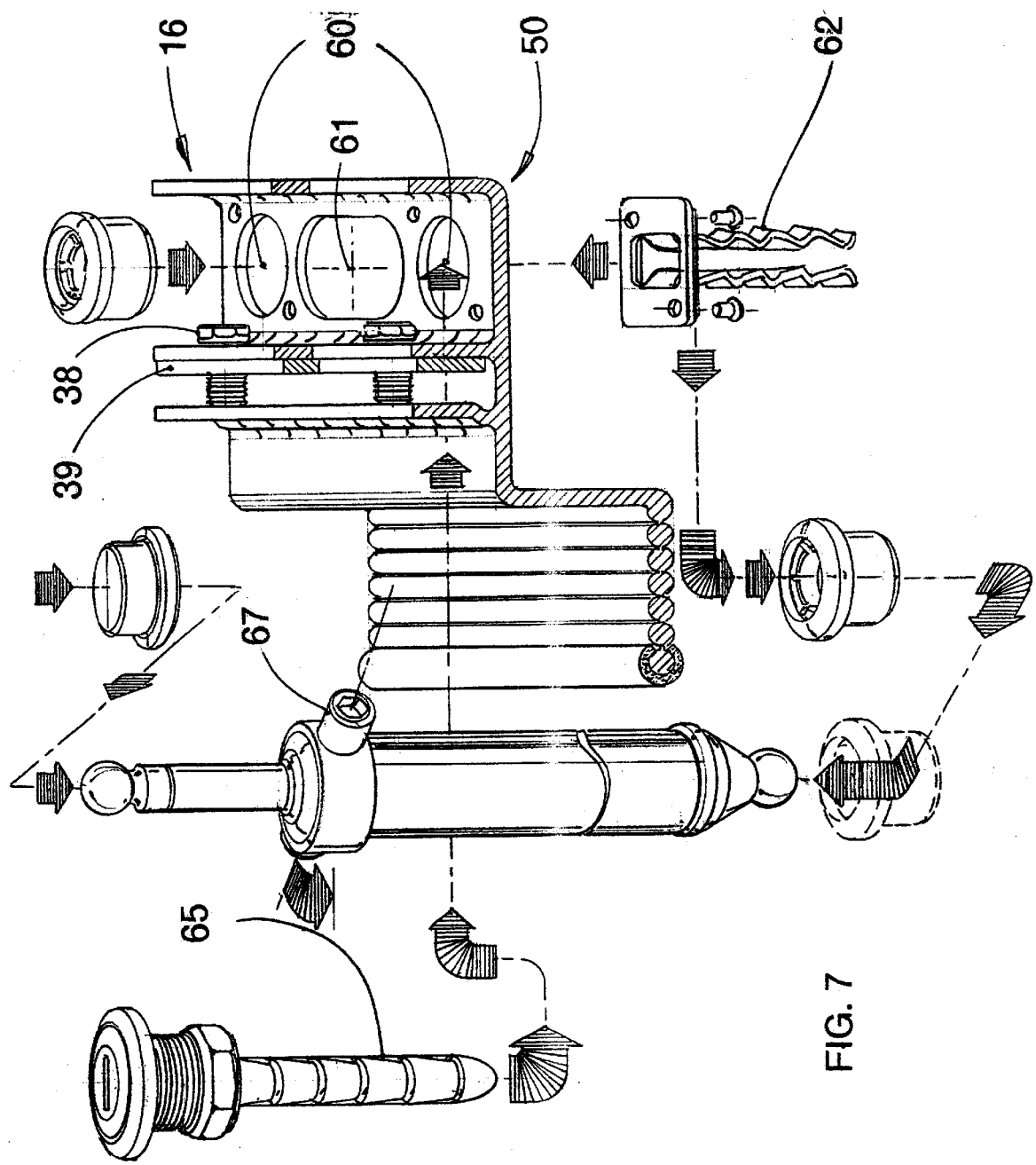
FIG. 7 is an exploded perspective view of the attachment bracket of FIG. 6 showing its relationship to several related components.

Referring to FIGS. 6, 6*a* and 7, the attachment brackets 16 are shown in greater detail. Again, these brackets attach to the inner lip 11 of truck box walls 12 by means of a gripping section 17 without the need for drilling into the truck box walls or other permanent modifications to the truck, thus providing for easy installation. The gripping section 17 clamps onto the inner lip 11 of a truck box wall 12 preferably by means of bolts 38 through openings formed in the walls of gripping section. Preferably the bracket walls are sufficiently flexible to allow adjustment of the distance therebetween for clamping onto a truck box wall 12, or may be hinged or otherwise allow adjustment therebetween; and flexible spacers 39 are preferably disposed between inner lip 11 and the bracket walls to protect the finishes thereof.

The support section 50 of each attachment bracket 16 adapted to support a tonneau cover thereon, includes a plurality of substantially parallel upstanding walls 52, with each wall having a recess 54 defined in an upper edge thereof for detachably and pivotally receiving the support member 28 of the tonneau cover therein. In this preferred embodiment, the recess 54 is U-shaped to receive a pin, rod, or the like (indicated at 67 in FIG. 7) positioned perpendicularly through the support member 28 or fluid cylinder 18 as in this embodiment, and permit same to pivotally and removable rest on the support section 50. The recess could however be a multitude of shapes that pivotally and removable receive the support member, or could be replaced with openings that do not extend to the edges of the walls 52.

Also, the recesses 54 could receive the end of the support member such that it does not pivotally rest on the support section 50, but fixedly rests on the support section 50. With this option, the end of the support member 28 could allow the pivoting motion, or alternatively the support member 28 may not rotate. If the support member 28 does not rotate, the center panel 2 could manually be lifted off, or be raised only in the vertical direction by fluid cylinders, or otherwise moved vertically to allow access to the truck box 3. In all scenarios, with the support member 28 merely resting on the attachment bracket 16, the center panel 2 is easily removable to allow access to the entire truck box 3.

A stabilizing section 56 of the attachment bracket 16 in this preferred embodiment engages the inner surface of a truck box wall 12 to provide lateral support and stability to the tonneau cover. It is also preferably readily modifiable to fit most pickup models, but could be specific for particular models. In the preferred embodiment, the stabilizing section 56 comprises segments 58 which may be selectively removed to adjust the width of the stabilizing section. A bolt cutter 57 or similar tool could be used to simply clip off excess segments of the stabilizing section as shown in FIG. 6a. The width of the stabilizing section 56 could also be adjustable by means of a scissor jack type design, or some sliding members, or other appropriate adjustment method.

In order to protect the inner surface of truck side walls 12, and to prevent squeak, rattle, or other similar noises, a means for damping vibrations 59 is preferably disposed around the end of remote segment(s) 58 of the stabilizing section. Thus disposed, the vibration damping means 59 will be located between the inner surface of truck side walls 12 and stabilizing section 56. The means for damping vibrations 59 in the preferred embodiment comprises a plastic or similar material adapted to fit over the end of stabilizing section 59, but it could be made from formed foam, foam tape, or other materials.

The bracket 16 could easily be manufactured by extruding aluminum or steel. Such manufacturing would be inexpensive to tool and process, would not require welds, and could be made as a single unit. It would also allow for easy manufacture of the removable segments 58 of the stabilizing section 56. The bracket 16 could alternatively be made by stamping and welding processes, a casting process, or extruded from a sufficiently strong plastic, or other methods and materials.

As also shown in FIG. 7, the bracket 16 has a pair of spaced openings 60 and a central opening 61 formed through the support section 50. The central opening 61 receives the rod of the fluid cylinder 18 therethrough, while openings 60 function to respectively receive therein a latch bracket 62 and a support grommet 64. The latch bracket 62 receives the lower end of a lockable latch 65 therein, while the upper end of the latch is fixed through the central panel 2. In use a key would be inserted into the latch and turned for either locking it to the bracket 62 or releasing it therefrom. The grommet 64 is used together cylinder 18 according to another aspect of the invention as shown in FIGS. 10 and 11a–11c. Particularly, the lower end of the cylinder is never fixed in place, but can be selectively disposed in a floating manner such that it either hangs below the bracket 16 (in normal use as in FIGS. 11a, 11b) or is lifted from the bracket and supported in the grommet (for raising the central panel to a greater extent above the bracket 16, as in FIG. 11c).

Figure 12:
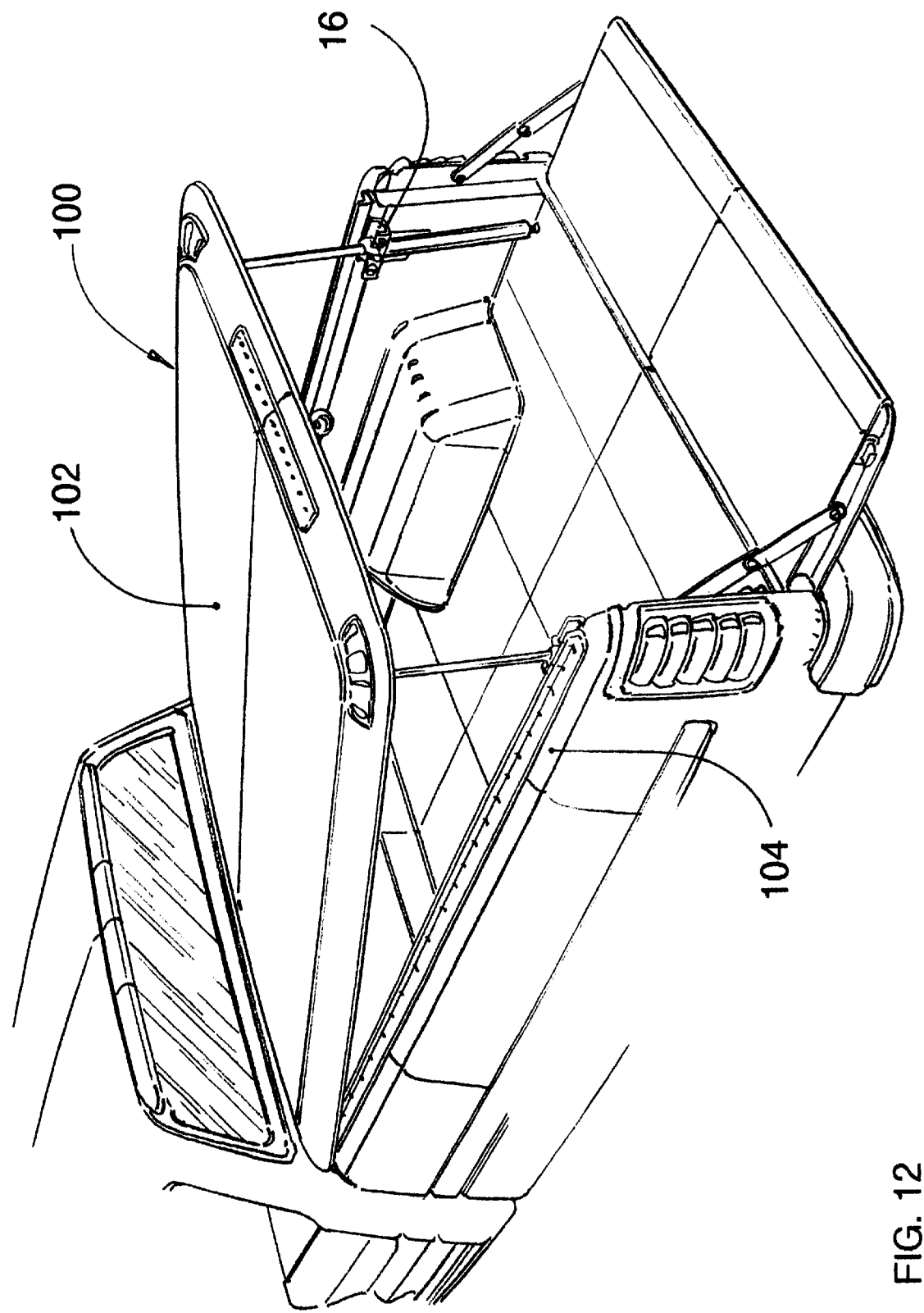
FIG. 12 is a perspective view of a pickup type vehicle having a rigid tonneau cover mounted thereon in accordance with the second preferred embodiment of the invention including a mechanism which assists opening of the cover through opening of the tailgate.
Figure 13:
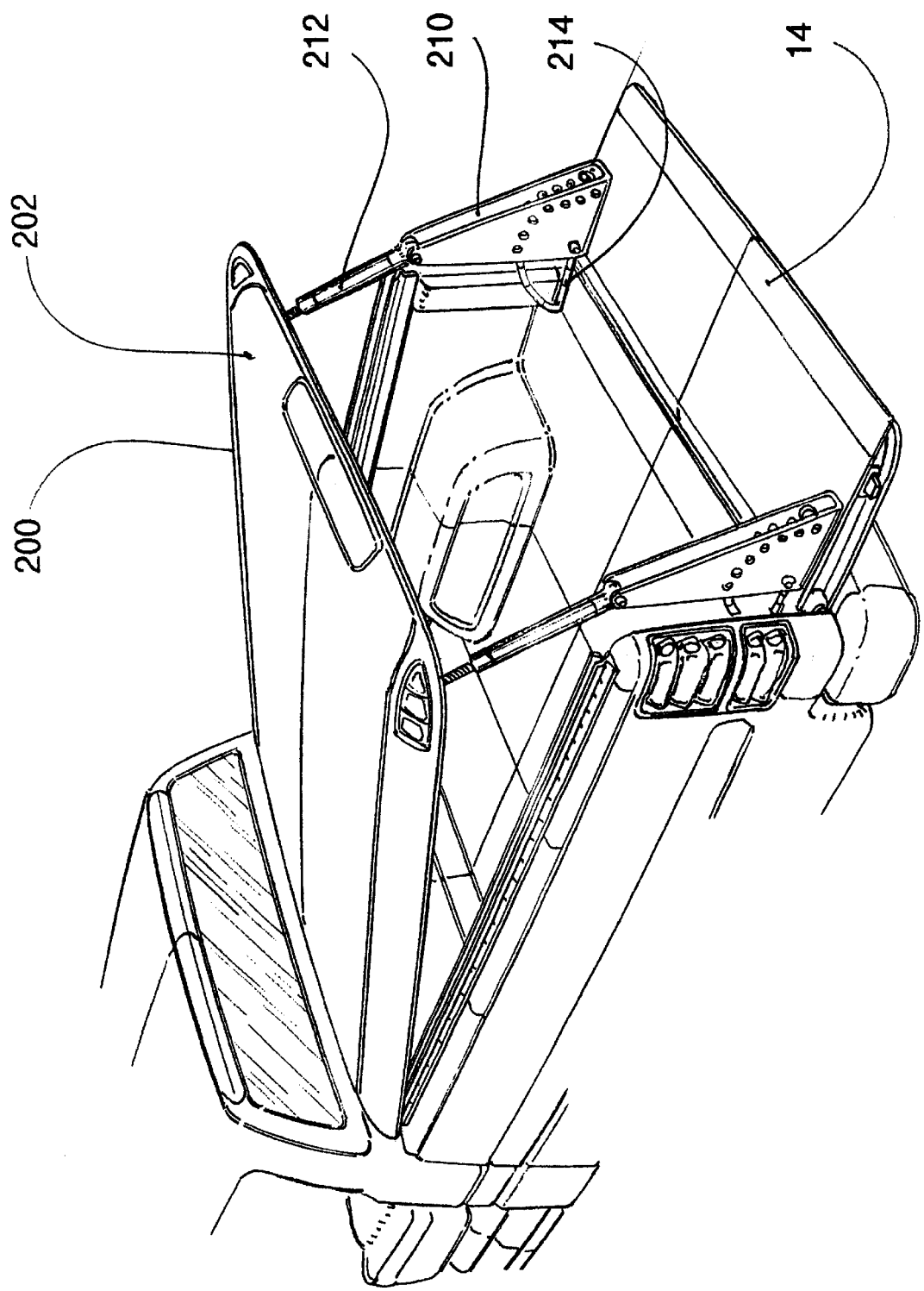

Referring to FIG. 12, there is shown a rigid cover 100 for a pickup truck bed according to the second preferred embodiment of present invention. The tonneau cover 100 generally includes a rigid center panel 102, two rigid side panels 104, each adapted to be fixed along a top edge of one longitudinal side wall 12 of a truck box 3, with the center panel 102 engaging the side panels 104 in a closed position of the center panel 102; and means for supporting the center panel 102 on the truck box 3 such that the rearward side of center panel 102 may be vertically and rotationally moved relative to the truck box, between the closed position and an open position in which the rearward side of the center panel 102 is disposed above the side panels 104. The second preferred embodiment differs from the first preferred embodiment in that the center panel 102 is preferably pivotally connected at the front side thereof to the truck box, and the center panel 102 is opened by vertically rotating the rear side of center panel 102 about the front wall 13 of the truck box. Except for preferences and aspects related to pivotally opening the center panel 102, all other preferences and aspects are the same as the first preferred embodiment. Means for pivotally connecting the center panel 102 include hinges common to the art.

Fluid cylinders 18 are, again, preferable for use as a raising means to raise rear side center panel 102 into an open position as shown, since fluid cylinders provide the option of selectively opening the center panel into multiple positions. Rigid bars, prop rods, or other like means could however be used as raising means, but may limit the amount of open positions.

By use of preferred attachment brackets 16 detailed in the first preferred embodiment, fluid cylinders 18 may be lifted from U-shaped slots 54 and the center panel raised even further as discussed. The base of the extended fluid cylinders would preferably rest on the attachment brackets 16 in this step of opening. The center panel 102 could continue opening as far as needed by removing the fluid cylinders 108 from resting on the attachment brackets 16.

As in the first preferred embodiment, the raising means are preferably activated by a spring loaded actuator switch or the like mounted on one of the side walls 12 at the point where the tailgate 14 closes. Opening of the tailgate causes the spring loaded actuator switch to close and thereby cause fluid cylinder raising means to actuate and rotate the center panel 102 to an open position. Further opening options using multistage fluid cylinders could be accomplished using various controls as discussed in the first embodiment above.

Referring to FIGS. 13 and 13a–13e there is shown a rigid cover 200 for a pickup truck bed according to the third preferred embodiment of the present invention. The tonneau cover 200 is very similar to the cover 100 except that means 208 are provided for automatically lifting the rear end of the central panel 202 with opening of the tailgate 14. The means 208 include brackets 210 fixed to the tailgate, support props 212 connected between the brackets 210 and the panel 202, and hinges 214 operatively cooperating with the brackets 210. The props 212 may be disconnected from the panel 202 or from the brackets 210 for completely removing the panel 202.

Although not shown the third and second embodiments may include a front panel as well.

Although the present invention has been described herein with respect to preferred embodiments thereof, the foregoing descriptions are intended to be illustrative, and not restrictive. Those skilled in the art will realize that many modifications of the preferred embodiments could be made which would be operable. All such modifications which are within the scope of the claims are intended to be within the scope and spirit of the present invention.

What is claimed is:

1. A tonneau cover for covering a truck box of a pickup type vehicle, comprising:

a rigid center panel, two rigid side panels, each adapted to be fixed on a top edge of one longitudinal side wall of a truck box, said center panel engaging said side panels in a closed position of the center panel; and means for supporting said center panel on said truck box such that said center panel may be vertically moved relative to the truck box, between said closed position and an open position in which the center panel is entirely disposed above the side panels.

2. A tonneau cover as recited in claim 1 wherein said side panels have inner longitudinal sides and comprise sealing means disposed on said inner longitudinal sides of said side panels for sealingly engaging said center panel in said closed position thereof.

3. A tonneau cover as recited in claim 1 wherein said center panel is disposed substantially parallel to said side panels in said open position.

4. A tonneau cover as recited in claim 1 wherein said support means includes a plurality of attachment brackets adapted to be fixed to said side walls of said truck box, and pivot means connected between said attachment brackets and lateral sides of said center panel for permitting the center panel to move between said open and closed positions thereof.

5. A tonneau cover as recited in claim 4 wherein said pivot means includes two pivot mechanisms connected to each lateral side of the center panel.

6. A tonneau cover as recited in claim 5 wherein each said pivot mechanism includes a fluid cylinder for raising said center panel.

7. A tonneau cover as recited in claim 6, wherein each fluid cylinder is adjustably extensible for raising said center panel to different heights.

8. A tonneau cover as recited in claim 1 further comprising:

a rigid front panel adapted to be disposed forwardly of said center panel on said truck box, and engaging said side panels and said center panel in a closed position of the front panel; and means for supporting said front panel on said truck box such that said front panel may be vertically moved relative to said truck box, between said closed position thereof and an open position in which the front panel is entirely disposed above the side panels.

9. A tonneau cover as recited in claim 1 further comprising:

a rigid front panel adapted to be disposed forwardly of said center panel on said truck box, and engaging said side panels and said center panel in a closed position thereof of the front panel; and means for pivotally attaching said front panel to said truck box such that said front panel may rotate about said truck box, between said closed position thereof and an open position thereof in which one lateral side of said front panel is disposed above a corresponding one of said side panels.

10. A tonneau cover as recited in claim 1 wherein said side panels and said center panel are molded of plastic.

11. An attachment bracket for supporting a tonneau cover on a truck box of a pickup, the bracket comprising:

gripping means for clamping on an upper lip of a sidewall of a truck box of a pickup;

a support section adapted to support said tonneau cover thereon;

a stabilizing section adapted to engage an inner surface of said truck box side wall; and said support section includes a plurality of substantially parallel upstanding walls each said wall having a recess defined in an upper edge thereof for detachably and pivotally receiving a support member of the tonneau cover therein.

12. An attachment bracket as recited in claim 11, wherein said gripping means comprises:

a pair of opposing gripping wall elements adapted to clamp said upper lip of said truck sidewall therebetween; and means for adjusting a distance between the gripping wall elements.

13. An attachment bracket as recited in claim 11, wherein said stabilizing section is adjustable so as to extend different distances away from said gripping means.

14. An attachment bracket as recited in claim 13, wherein said stabilizing section comprises a plurality of removable segments to adjust the width of said stabilizing section.

15. An attachment bracket as recited in claim 14, wherein said stabilizing section further comprises a means for damping vibrations between said stabilizing section and said truck box side wall to protect the inner surface of said truck box side wall.

* * * * *